E. C. BLAKESLEE,

Assignor, by mesne assignments, to C. DETWEILER.

MACHINE FOR THREADING SHEET METAL SCREWS.

No. 9,908. Reissued Oct. 25, 1881.

Witnesses.

S. P. Fowler

Henry Hubbe

Inventor.

E. C. Blakeslee

UNITED STATES PATENT OFFICE.

EDWARD C. BLAKESLEE, OF BROOKLYN, NEW YORK, ASSIGNOR, BY MESNE ASSIGNMENTS, TO CYRUS DETWEILER, OF PHILADELPHIA, PA.

MACHINE FOR THREADING SHEET-METAL SCREWS.

SPECIFICATION forming part of Reissued Letters Patent No. 9,908, dated October 25, 1881.

Original No. 116,922, dated July 11, 1871. Application for reissue filed August 6, 1881.

*To all whom it may concern:*

Be it known that I, EDWARD C. BLAKESLEE, formerly of New Haven, Connecticut, but now of Brooklyn, in the State of New York, have invented certain new and useful Improvements in Machines for Threading Sheet-Metal Caps; and I hereby declare that the following is a full, clear, and exact description thereof, reference being had to the drawings which accompany and form part of this specification.

Figure 1:
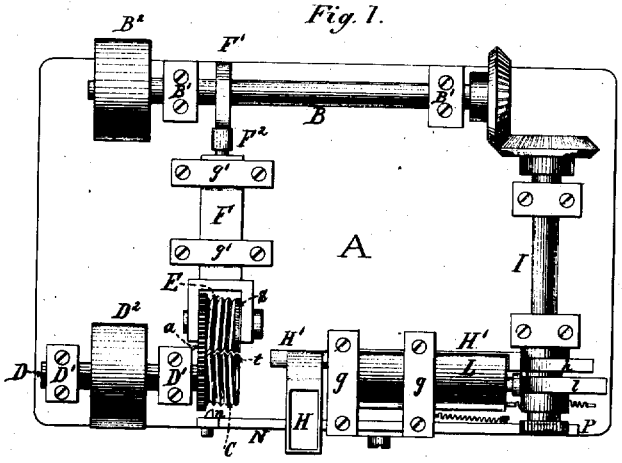
Figure 2:
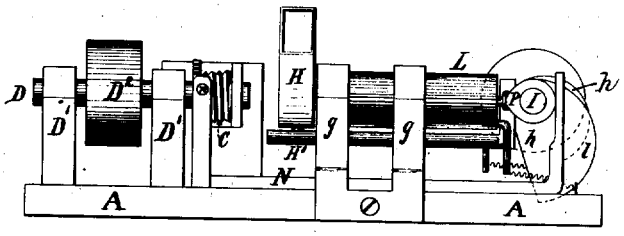
Figure 3:
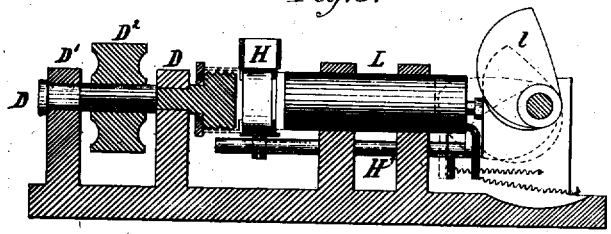

Of the drawings, Figure 1 is a top view of a form of machine which embodies my improvements. Fig. 2 is a front view, and Fig. 3 is a sectional view, of the same machine.

The object of this invention is to produce an automatic machine for screw-threading sheet-metal caps which shall be capable of being operated with great rapidity and certainty, so as thereby to perform the largest amount of work at the smallest cost and with the least percentage of fractured metal or "scrap."

My improvements principally consist, first, in combining right and left hand screw-threading rolls which are geared so as to run together, and the respective threads and grooves of which match into each other, with means for moving one of them toward the other at a right angle to their axis, so as to compress between them and thereby roll the screw-threads into a sheet-metal blank placed on one of the rolls; second, in combining with such right and left hand screw-threading rolls, operated as described, suitable means for maintaining the blank in place on one of the rolls while it is being threaded; third, in combining with such screw-threading rolls and such means for maintaining the blank in place mechanism for operating all these parts automatically, so that the machine can be driven rapidly and kept in continuous motion without requiring to be stopped or the movement of the rolls reversed to introduce the blanks or remove the finished caps.

This invention is chiefly designed for threading such sheet-metal caps as are used for lanterns, fruit-jar tops, &c., the blanks for this class of caps being first formed or shaped by a separate operation of spinning or stamping in the ordinary way.

To enable others to put my improvements in practice I will describe them in detail as they are shown in the drawings, which represent a form of my machine which has been employed in practical work with entire success.

A is a bed-plate, upon which all the mechanism is arranged.

C and E are the screw-threading rolls, one of them having a right-hand and the other a left-hand screw-thread. C is the one upon which the blank is placed and maintained to be threaded, and may therefore be termed the "internal" or "interior" threader, and E is the one which compresses the blank upon the interior threader and rolls the screw-threads into it. It may therefore be termed the "external" or "exterior" threader. The threading-roll C is fixed to the end of a shaft, D, which is supported in bearings D′ D′, and is caused to revolve continuously by the application of power through the pulley $D^2$ or otherwise. The threading-roll E is arranged in a slide or carrier, F, and is moved by the cam F′ on the driving-shaft B to and from the threading-roll C at a right angle to the axis of the latter, so that when the blanks are being threaded the rolls are parallel with each other, and thereby roll all the threads simultaneously into the whole threaded width of the blank. The two threading-rolls are geared together by the pinion-gears *a a*, which are respectively fast on the shafts of the threaders and insure the rotation of the latter in unison. These pinions are so adjusted that when the cam F′ is in operation they will separate sufficiently far, without becoming disengaged, to allow a blank to be placed on the threader C, the threaders themselves being also, in the operation of the machine, separated only about far enough to admit of the passage of the blanks between them.

L is a follower, or, as it may be properly termed, a "holder and pusher." It is so arranged as to be in line with the blank when the latter is in position on the threading-roll C, and it is sustained by and moves backward and forward in suitable guides formed by standards *g g* erected on the bed-plate A. It is actuated toward the threading-rolls by the cam *l* on the counter-shaft I, and is withdrawn from them by the retracting-spring, (shown in Figs. 2 and 3,) and its principal or most essential function is to hold or maintain the blank in proper position between the threading-rolls while the screw-threads are being rolled into it. For this purpose it is to be operated by the cam *l* and the retracting-spring, that it can be brought up in front of the end of the threading-roll C, and behind the blank when the latter is in position on the roll and caused to hold the blank in place till the threading is completed, and then can be withdrawn to permit the cap to be discharged. This office of this part of the mechanism is important, for the reason that to enable the machine to do the greatest amount of work in the shortest time it must have capacity to be driven continuously at high speed, and to secure this it is essential, in order to discharge the threaded caps and admit fresh blanks, that the rotation of the rolls shall run the latter off the threader C at all times when they are not held in place by external means. The holder L provides this means, and maintains the blanks on the threader until the threading is fully completed. It then promptly disengages from them, and the caps instantly run off and drop into the receptacle placed underneath the machine for the finished work.

A hopper, H, carried on the sliding bar H′, to contain a quantity of blanks to be fed into the machine, is combined with the other parts. As shown in the drawings, this hopper is actuated by a cam, *h*, on the before-mentioned counter-shaft I, which latter is geared to the driving-shaft B, as seen in Fig. 1, and by the action of the cam and the retracting-spring (shown in Figs. 2 and 3) attached to the sliding bar H′ is alternately carried forward from its position in Fig. 2 to its position close up to the threaders in Fig. 3, and then drawn back again. An opening is made through the sides of the hopper in line with the follower or holder L, and also with the threading-roll C. This opening should be larger than a single blank, so as to permit each successive lowest blank in the hopper to pass freely through the opening onto the threader C. The hopper may be supplied with a number of blanks, the number depending, of course, upon the size of the hopper, and as the follower or holder is forced up to the threading-roll C, as above described, its forward end enters the opening in the hopper, and, as its pushing function here comes into operation, it pushes the lowest blank out from the latter onto the threader C, as denoted in broken lines in Fig. 3. The pusher and hopper are then withdrawn by the retracting-springs before mentioned, and the operation is repeated.

The hopper may, if desired, be carried forward onto the threader C, so as to leave the blank on the threader when the hopper is withdrawn; but I prefer to only carry it up to the threader, and then transfer the blanks to it from the threader by the operation of the follower or pusher, as above described.

It is apparent that the hopper, in addition to being a receiver of blanks to be fed into the machine, serves also as a guide to direct or present the successive blanks properly to be driven by the pusher onto the threader C. This results from the fact that the bottom of the hopper, and hence the bottom of the opening in its sides, is level with the bottom of the threader, as seen in Figs. 2 and 3, so that when the lowest blank (which must always rest on the bottom of the hopper) is pushed out through the opening it must necessarily be carried evenly onto the threader. This guide function is of great value, whether the hopper contains at any moment many blanks or only one, because if the workman is obliged to put each blank on the threader by hand his fingers are liable, when the machine is run at high speed, to be crushed between the threader and follower; but by using the hopper to direct the blanks to the threader all such danger is avoided.

In order to form a milled surface upon the caps, the exterior threading-roll, E, as shown in the drawings, is provided at its outer end with a groove, *s*, which is cut so as to constitute a knurl, and the interior threading-roll is provided at its outer end with a corresponding reversed former, *t*. The combined operation of these devices will, as the threading-rolls thread the blanks, impress any desired milled surface upon the latter.

It is also in many cases desirable to turn or trim the edge of the blanks slightly. For this purpose I arrange a tool, *n*, in a sliding bar, N, which is actuated by a cam, P, on the counter-shaft I in such manner that as the blanks are forced by the follower or pusher L onto the threading-roll C the tool will be pressed against the edge of the blank, causing the latter to turn, and thereby to receive from the tool the desired finish for its edge.

In order to operate automatically the above-described working parts of the machine, the standards D′ D′ supporting the shaft D and pulley $D^2$, already referred to, and the standard B′ B′, are erected on the bed-plate A. In these latter standards is mounted the shaft B, carrying the pulley $B^2$, to receive power from some motor, and suitably geared to the before-mentioned counter-shaft I, which is also mounted in standards set up on the bed-plate.

Fixed on the shaft B is the before-referred-to cam F′, for imparting movement to the threading-roll E and pressing it by a positive force against the roll C and the blank thereon. This it does through the slide or carrier F, which is provided for the purpose with a bearing-block, $F^2$, at its rear end, and which is supported and moves in suitable guides, *g′ g′*, on the bed-plate, the rotation of the cam giving to the carrier and roll E their forward travel or movement, while their backward movement may be effected by a retracting-spring or other convenient means. This shaft B and the counter-shaft I, which it drives through the gearing referred to, both revolve at the same speed, as will be seen, and may be caused to make one revolution to about two of the threading-rolls.

The counter-shaft I carries the cam *l*, which actuates the follower or holder L in the manner and for the purposes which have already been described. It also carries the cam *h*, which operates the sliding bar H′, on which the hopper H is placed, and also the cam P, which actuates the sliding bar N, to which the edging-tool *n* is secured. The faces of all the respective cams are, of course, so formed that the movements they cause in the different parts of the machine which they actuate shall all be timed at regular intervals relatively to each other. Consequently, while the threading-rolls are revolving continuously, all the reciprocatory movements of the holder in coming up behind the blank to sustain it in place during the threading, and, as soon as it is threaded, in withdrawing and allowing the rolls to run the finished cap off; of the carrier F in bringing the threader E up to the blank to roll the threads into it and then receding to permit another blank to be introduced; of the hopper, when that is used, in moving up to the roll C to supply successive blanks to it, and of the knurls and the edging-tool to do their work, are made at the precise instants requisite to perform their respective functions with accuracy and with the least liability of fracturing or spoiling the blanks.

The mechanism being thus organized, its automatic action is effected whenever power is applied to the two pulleys $D^2$ and $B^2$, and by means of the continuous revolution of the threaders, in combination with this automatic action, the machine is rendered capable of being driven at high speed, and thereby of producing the greatest amount of work in the shortest time and at the smallest cost.

Having thus described my improvements, what I claim therein as new is—

1. In a machine for screw-threading sheet-metal caps, the combination of geared right and left screw-threaded rolls with means for rotating one of the rolls, and with suitable mechanism for causing one of them to automatically, at regular intervals, advance to and recede from the other in a line substantially at a right angle with their axis, in such manner as to compress between them and to roll all the threads simultaneously into a sheet-metal blank placed on one of the rolls.

2. In a machine for screw-threading sheet-metal caps, the combination of geared right and left screw-threaded rolls, and means for rotating one of the rolls, with mechanism for causing one of them to automatically advance to and recede from the other in a line substantially at a right angle with their axes, and with a follower or holder for maintaining the blanks in place on one of the rolls while they are being threaded.

3. The combination of screw-threading rolls with a holder and with suitable mechanism for causing such holder to automatically, at regular intervals, advance to and recede from the roll on which the blanks are placed to be threaded in such manner as to maintain the blanks on the roll until the threading is completed, and then to withdraw to permit the finished caps to be discharged.

4. The combination, with the holder and threading-roll C, of a hopper or supporter adapted to receive and present or guide the blanks, whereby they are fed evenly onto the threading-roll.

5. The combination, with the holder and the threading-roll C, of a hopper arranged on a sliding bar operated as described.

6. The combination of the shafts B and D, the geared threading-rolls, the carrier F, and the cam F′.

7. The combination of the continuously-revolving screw-threaded rolls, roll-carrier F, and shaft B, having the cam F′, with a hopper, a holder, and shaft I, provided with cams for actuating them.

8. The combination of the continuously-revolving screw-threaded rolls, roll-carrier F, and shaft B, having the cam F′, with the holder and with the shaft I, provided with the cam *l* for actuating it.

E. C. BLAKESLEE.

Witnesses:
HENRY KNIBB,
S. P. FOWLER.